United States Patent Office.

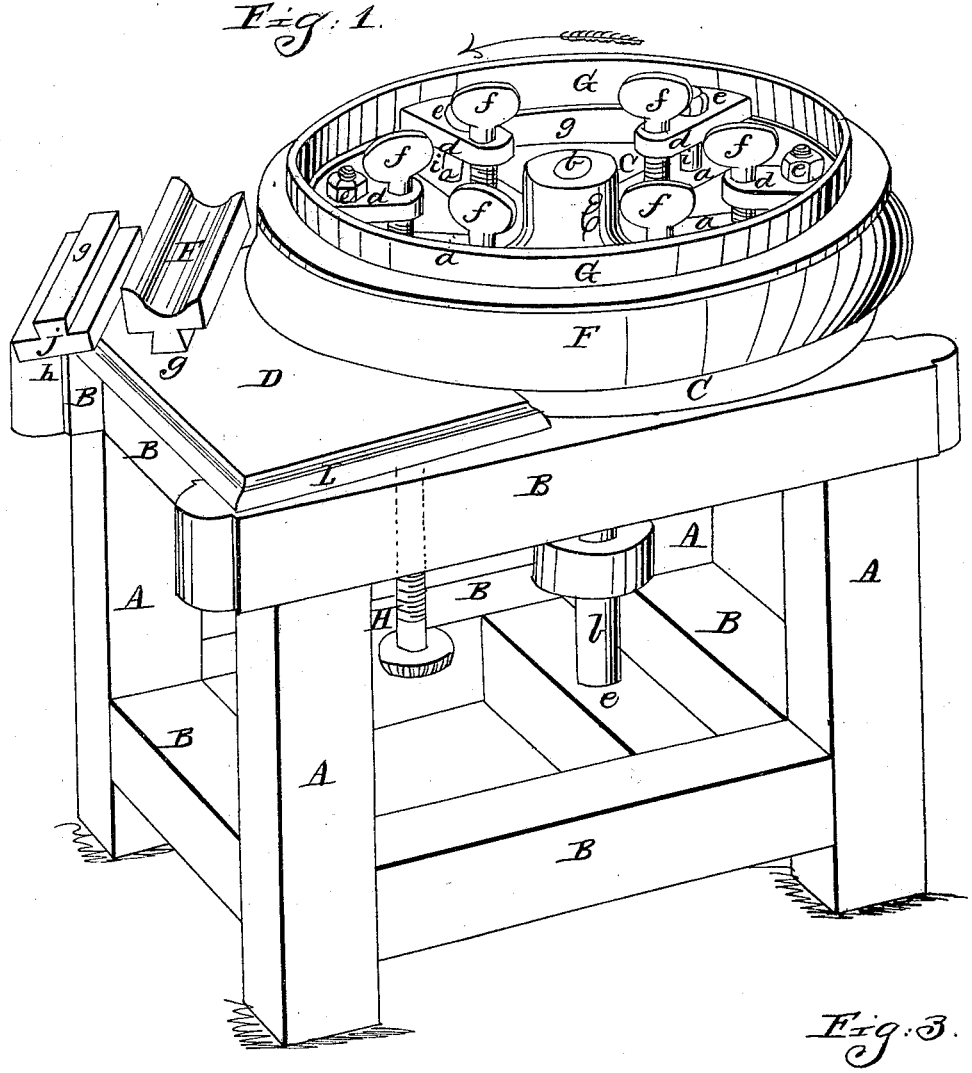

BENNET C. PERRY, OF BRIDGEPORT, CONNECTICUT.

Letters Patent No. 90,296, dated May 18, 1869.

---

IMPROVEMENT IN POLISHING-MACHINE FOR POLISHING WOOD-MOULDINGS, &c.

---

The Schedule referred to in these Letters Patent and making part of the same.

---

*To all whom it may concern:*

Be it known that I, BENNET C. PERRY, of the city of Bridgeport, in the county of Fairfield, and State of Connecticut, have invented a new and useful Improvement in Machines for Polishing; and I do hereby declare that the following is a full, clear, and exact description of the construction, character, and operation of the same, reference being had to the accompanying drawings, which make part of this specification, in which—

Figure 1 is a perspective view of the whole machine, showing the surface for polishing one shape of the mouldings, the circles which secure it in its place, one of the set-screws which adjust the work-table, and two segments of the India-rubber circle.

Figure 2 is a cross-section of the periphery of the circle of India rubber, with a flat face.

Figure 3 is a cross-section of the curved surface of the periphery for polishing mouldings.

My improvement consists in forming the periphery or circular surface of the polishing-wheel of vulcanized India rubber, to be coated or covered with any suitable polishing-substance suited to polish either a flat surface or any and every variety of curved surfaces known by the name of mouldings, on wood, metal, stone, &c., and in fitting to the frame, near the periphery of the wheel, a suitable work-table, resting on set-screws, so that it may be adjusted to any desired pitch or angle to the periphery of the polishing-wheel, and thereby enable me to polish a surface, an edge, or a corner, at any desired angle or surface-configuration.

I make the frame of wood, or any other suitable material, of posts and rails, or beams, in the ordinary way, as represented at A A, B B, &c., in a proper manner to sustain the polishing-wheel C C and work-table D.

I make the main portion of the polishing-wheel of cast-iron, or any other suitable material, in the form of a circular rim or web, as indicated at C C, with suitable arms or spokes, as indicated at $a$ $a$, &c., and a suitable hub or nave, E, so that it may revolve on a vertical shaft, $b$ $b$, properly stepped, as represented at $c$.

I make the upper rim or binding-circle G G of cast-iron, or any other suitable material, of the same diameter as the lower part C C, and of suitable strength to firmly hold the India-rubber circle in its place for polishing, and with arms projecting inward or towards the centre, as represented at $d$ $d$, &c., of the same number, and in the same relative position as the spokes $a$ $a$, &c., by means of which I secure it to the lower rim C C by screw-bolts $i$ $i$, &c., which pass through the arms or spokes $a$ $a$, &c., and arms, $d$ $d$, &c., which I hold in place by the nuts $e$ $e$, &c., above the projecting arms $d$ $d$, &c. And, to give the ring G G the desired pitch in all its parts, I fit graduating thumb-screws, as $f$ $f$, &c., which work on the spokes $a$ $a$ &c., to adjust the rim and cause it to bear properly on the dovetail.

I make the central or polishing-portion F of the wheel of vulcanized India rubber, moulding it in any convenient number of pieces, with a dovetail on the back or inner side, as represented in perspective at $g$ $g'$, fig. 1, and in cross-section at $g$ $g$, figs. 2 and 3, to fit or be firmly held between the two rims C C and G G, as indicated at G', fig. 1.

And I make the front or outer surface, to which the polishing-material is to be applied, flat, as represented in section at $h$, fig. 2, and in perspective at $h$, fig. 1, to render it suitable for polishing flat surfaces, whether it be the edge, the end, or the broad side of a board or any other article.

Or, I mould the gum on any desired form or moulding-surface, as represented in cross-section at F, fig. 3, and in perspective in fig. 1, or according to any other pattern desired.

Having made the two metallic rims C C and G G, with their appendages, and cast or moulded the pieces of rubber, substantially as described, I place the dovetail portions $g$ of the pieces of the India rubber on to the upper edge of the lower rim C C, fitting the ends of the pieces so as to form a full and smooth surface to operate, and place the upper rim G G above and on to the dovetail portions $g$ of the rubber, pass the screw-bolts $i$ $i$, &c., through the spokes $a$ $a$, &c., and arms, $d$ $d$, &c., turn the nuts, $e$ $e$, &c., and adjust the thumb-screws $f$ $f$, &c., when the rubber will be firmly secured between the two metal rims C C and G G, substantially as represented in fig. 1.

I then cover the periphery of the India rubber, as represented at F, fig. 1, with a suitable polishing-substance, such as sand-paper, emery-cloth, or any other similar material, by glueing it on to the rubber; or I glue paper, cloth, leather, or any other analogous material on to the periphery or circular face of the wheel, coat it over with glue, and then sprinkle or roll on sand, ground flint, emery, or other suitable substance, so as to give a proper polishing-surface to the periphery of the wheel; or the glue may be spread on the rubber, and the polishing-substance thrown thereon; but I do not prefer that way of coating the periphery; but when coated in either way, it will be ready for use.

I make the work-table D of wood, or any other suitable material, suited to the size of wheel; and I adjust it to any desired pitch or inclination by means of any convenient number of adjusting-screws, one of which is represented at H, by means of which the peculiar bevel of the moulding may be varied at pleasure.

To use this machine, when the moulding has been stuck on the edge or end of a board, as represented at L, fig. 1, I set the polishing-wheel in rapid motion in the direction indicated by the dart, take the board in my hands, rest it on the previously-adjusted work-table D, bring the moulding against the polishing-surface F, and move it rapidly to the left or against the motion of the wheel, when the grit or polishing-substance on the periphery F will completely polish the moulding fit for use.

This wheel may be made of any desired diametrical or vertical dimensions, so as to polish any surface, and the periphery or polishing-surface may be either flat or of any curve or series of curves, either concave or convex, so as to polish a moulding of any desired configuration in the cross-section, or straight or curved on the edge or end, leaving the corners square, convex, or concave, and be fitted for the most rapid abrasion, or for the finest finish which may be desired for wood, metal, stone, glass, or other material, as the periphery of the India-rubber circle can be cast or moulded to fit any moulding which can be stuck by any tool or series of tools.

The advantages of my improvement consist in that, by the use of the vulcanized India-rubber circle or rim, held between the two metallic or inflexible circles or rims, I cannot only give it the desired form in the cross-section, with the least trouble, but can also readily fit it to a wheel of any desired diameter, as will bend or conform to any periphery; and in that its elasticity or yielding character will allow it to conform to the slight inequalities of the unfinished surface, and will entirely obviate or prevent the chattering and unequal motion, so common in polishing, so that it will quietly polish the surface smoothly, even though it should leave it slightly undulating.

What I claim as my invention, and desire to secure by Letters Patent, is—

The combination of the vulcanized India-rubber circle, with the two inflexible rims C C and G G, when they are constructed, arranged, and fitted for use, substantially as herein described and set forth.

B. C. PERRY.

Witnesses:
C. H. PORTER,
R. FITZGERALD.